(12) United States Patent
Pickett et al.

(10) Patent No.: US 8,394,976 B2
(45) Date of Patent: Mar. 12, 2013

(54) SURFACE FUNCTIONALISED NANOPARTICLES

(75) Inventors: Nigel Pickett, London (GB); Mark C. McCairn, Newent (GB); Steven M. Daniels, Manchester (GB); Imrana Mushtaq, Manchester (GB); Paul Glarvey, Stockport (GB)

(73) Assignee: Nanoco Technologies, Ltd. (GB)

( * ) Notice: Subject to any disclaimer, the term of this patent is extended or adjusted under 35 U.S.C. 154(b) by 617 days.

(21) Appl. No.: 12/612,379

(22) Filed: Nov. 4, 2009

(65) Prior Publication Data

US 2010/0113813 A1    May 6, 2010

Related U.S. Application Data

(60) Provisional application No. 61/111,093, filed on Nov. 4, 2008.

(30) Foreign Application Priority Data

Nov. 4, 2008    (GB) .................................. 0820101.4

(51) Int. Cl.
   *C07F 7/18* (2006.01)
(52) U.S. Cl. .............................. 556/9; 977/774; 977/896
(58) Field of Classification Search ...... 556/9; 977/774, 977/896
   See application file for complete search history.

(56) References Cited

U.S. PATENT DOCUMENTS

| | | | |
|---|---|---|---|
| 2,769,838 A | 11/1956 | Matter et al. | |
| 3,524,771 A | 8/1970 | Green | |
| 4,609,689 A | 9/1986 | Schwartz et al. | |
| 6,114,038 A | 9/2000 | Castro et al. | |
| 6,207,229 B1 | 3/2001 | Bawendi et al. | |
| 6,221,602 B1 | 4/2001 | Barbera-Guillem et al. | |
| 6,261,779 B1 | 7/2001 | Barbera-Guillem et al. | |
| 6,322,901 B1 | 11/2001 | Bawendi et al. | |
| 6,326,144 B1 | 12/2001 | Bawendi et al. | |
| 6,333,110 B1 | 12/2001 | Barbera-Guillem | |
| 6,379,635 B2 | 4/2002 | O'Brien et al. | |
| 6,423,551 B1 | 7/2002 | Weiss et al. | |
| 6,426,513 B1 | 7/2002 | Bawendi et al. | |
| 6,607,829 B1 | 8/2003 | Bawendi et al. | |
| 6,660,379 B1 | 12/2003 | Lakowicz et al. | |
| 6,699,723 B1 | 3/2004 | Weiss et al. | |
| 6,815,064 B2 | 11/2004 | Treadway et al. | |
| 6,855,551 B2 | 2/2005 | Bawendi et al. | |
| 6,914,264 B2 | 7/2005 | Chen et al. | |
| 6,992,202 B1 | 1/2006 | Banger et al. | |
| 7,041,362 B2 | 5/2006 | Barbera-Guillem | |
| 7,151,047 B2 | 12/2006 | Chan et al. | |
| 7,235,361 B2 | 6/2007 | Bawendi et al. | |
| 7,264,527 B2 | 9/2007 | Bawendi et al. | |
| 7,544,725 B2 | 6/2009 | Pickett et al. | |
| 7,588,828 B2 | 9/2009 | O'Brien et al. | |
| 7,674,844 B2 | 3/2010 | Pickett et al. | |
| 7,803,423 B2 | 9/2010 | O'Brien et al. | |
| 7,867,556 B2 | 1/2011 | Pickett | |
| 7,867,557 B2 | 1/2011 | Pickett et al. | |
| 2003/0017264 A1 | 1/2003 | Treadway et al. | |
| 2003/0106488 A1 | 6/2003 | Huang et al. | |
| 2003/0148024 A1 | 8/2003 | Kodas et al. | |
| 2004/0007169 A1 | 1/2004 | Ohtsu et al. | |
| 2004/0036130 A1 | 2/2004 | Lee et al. | |
| 2004/0110002 A1 | 6/2004 | Kim et al. | |
| 2004/0110347 A1 | 6/2004 | Yamashita | |
| 2004/0178390 A1 | 9/2004 | Whiteford et al. | |
| 2004/0250745 A1 | 12/2004 | Ogura et al. | |
| 2005/0098204 A1 | 5/2005 | Roscheisen et al. | |
| 2005/0129947 A1 | 6/2005 | Peng et al. | |
| 2005/0145853 A1 | 7/2005 | Sato et al. | |
| 2006/0019098 A1 | 1/2006 | Chan et al. | |
| 2006/0057382 A1 | 3/2006 | Treadway et al. | |
| 2006/0061017 A1 | 3/2006 | Strouse et al. | |
| 2006/0068154 A1 | 3/2006 | Parce et al. | |
| 2006/0110279 A1 | 5/2006 | Han et al. | |
| 2006/0118757 A1 | 6/2006 | Klimov et al. | |
| 2006/0130741 A1 | 6/2006 | Peng et al. | |
| 2007/0012941 A1 | 1/2007 | Cheon | |
| 2007/0034833 A1 | 2/2007 | Parce et al. | |
| 2007/0059705 A1 | 3/2007 | Lu et al. | |
| 2007/0104865 A1 | 5/2007 | Pickett | |
| 2007/0110816 A1 | 5/2007 | Jun et al. | |
| 2007/0114520 A1 | 5/2007 | Garditz et al. | |
| 2007/0125983 A1 | 6/2007 | Treadway et al. | |
| 2007/0131905 A1 | 6/2007 | Sato et al. | |
| 2007/0199109 A1 | 8/2007 | Yi et al. | |
| 2007/0202333 A1 | 8/2007 | O'Brien et al. | |
| 2007/0238126 A1 | 10/2007 | Pickett et al. | |
| 2008/0107911 A1 | 5/2008 | Liu et al. | |
| 2008/0112877 A1 | 5/2008 | Xiao et al. | |
| 2008/0121844 A1 | 5/2008 | Jang et al. | |

(Continued)

FOREIGN PATENT DOCUMENTS

| | | |
|---|---|---|
| CN | 1394599 | 2/2003 |
| EP | 1176646 | 1/2002 |

(Continued)

OTHER PUBLICATIONS

International Search Report for PCT/GB2009/001928 mailed Dec. 8, 2009 (3 pages).
International Search Report for PCT/GB2009/002605 mailed Feb. 22, 2010 (3 pages).
Search Report for GB0813273.0 searched Dec. 8, 2008 (1 page).
Search Report for GB0814458.6 searched Dec. 5, 2008 (1 page).
Search Report for GB0820101.4 searched Mar. 3, 2009 (1 page).
Cao, (2005) "Effect of Layer Thickness on the Luminescence Properties of ZnS/CdS/ZnS quantum dot quantum well", J. of Colloid and Interface Science 284:516-520.
Foneberov et al., (2005) "Photoluminescence of tetrahedral quantum-dot quantum wells" Physica E, 26:63-66.
Harrison et al. (2000) "Wet Chemical Synthesis on Spectroscopic Study of CdHgTe Nanocrystals with Strong Near-Infrared Luminescence" Mat. Sci and Eng.B69-70:355-360.

(Continued)

*Primary Examiner* — Porfirio Nazario Gonzalez
(74) *Attorney, Agent, or Firm* — Wong, Cabello, Lutsch, Rutherford & Brucculeri LLP.

(57) ABSTRACT

Embodiments of the invention relate to a process for the production of surface functionalised nanoparticles, such as semiconductor quantum dot nanoparticles incorporating surface-bound functional groups suitable for enabling the dots to be incorporated into silicone polymers.

17 Claims, 1 Drawing Sheet

U.S. PATENT DOCUMENTS

| | | |
|---|---|---|
| 2008/0160306 A1 | 7/2008 | Mushtaq et al. |
| 2008/0190483 A1 | 8/2008 | Carpenter et al. |
| 2008/0220593 A1 | 9/2008 | Pickett et al. |
| 2008/0257201 A1 | 10/2008 | Harris et al. |
| 2008/0264479 A1 | 10/2008 | Harris et al. |
| 2009/0139574 A1 | 6/2009 | Pickett et al. |
| 2009/0212258 A1 | 8/2009 | McCairn et al. |
| 2009/0263816 A1 | 10/2009 | Pickett et al. |
| 2010/0059721 A1 | 3/2010 | Pickett et al. |
| 2010/0068522 A1 | 3/2010 | Pickett et al. |
| 2010/0123155 A1 | 5/2010 | Pickett et al. |
| 2010/0193767 A1 | 8/2010 | Naasani et al. |
| 2010/0212544 A1 | 8/2010 | Harris et al. |

FOREIGN PATENT DOCUMENTS

| | | |
|---|---|---|
| EP | 1783137 | 5/2007 |
| EP | 1854792 | 11/2007 |
| GB | 1995189106 | 9/1995 |
| GB | 2429838 A | 3/2007 |
| JP | 2005139389 A | 6/2005 |
| WO | WO-9710175 | 3/1997 |
| WO | WO-0017642 | 3/2000 |
| WO | WO-0204527 | 1/2002 |
| WO | WO-0224623 | 3/2002 |
| WO | WO-0229140 | 4/2002 |
| WO | WO-03099708 | 4/2003 |
| WO | WO-2004008550 A2 | 1/2004 |
| WO | WO-2004033366 A1 | 4/2004 |
| WO | WO-2004065362 A2 | 8/2004 |
| WO | WO-2004066361 A2 | 8/2004 |
| WO | WO-2005021150 A2 | 3/2005 |
| WO | WO-2005106082 A1 | 11/2005 |
| WO | WO-2005123575 A1 | 12/2005 |
| WO | WO-2006001848 | 1/2006 |
| WO | WO-2006017125 A2 | 2/2006 |
| WO | WO-2006075974 A1 | 7/2006 |
| WO | WO-2006116337 A2 | 11/2006 |
| WO | WO-2006118543 A1 | 11/2006 |
| WO | WO-2006134599 A1 | 12/2006 |
| WO | WO-2007020416 A1 | 2/2007 |
| WO | WO-2007049052 A2 | 5/2007 |
| WO | WO-2007060591 A2 | 5/2007 |
| WO | WO-2007065039 A2 | 6/2007 |
| WO | WO-2007098378 | 8/2007 |
| WO | WO-2007102799 A2 | 9/2007 |
| WO | WO-2008013780 A2 | 1/2008 |
| WO | WO-2008054874 A2 | 5/2008 |
| WO | WO-2008133660 A2 | 11/2008 |
| WO | WO-2009016354 A1 | 2/2009 |
| WO | WO-2009040553 | 4/2009 |
| WO | WO-2009106810 A1 | 9/2009 |

OTHER PUBLICATIONS

Sheng et al. "In-Situ Encapsulation of Quantum Dots into Polymer Microspheres", Langmuir 22(8):3782-3790 (2006).
W. Peter Wuelfing et al., "Supporting Information for Nanometer Gold Clusters Protected by Surface Bound Monolayers of Thiolated Poly (ethylene glycol) Polymer Electrolyte" Journal of the American Chemical Society (XP002529160) (1998).
International Search Report for PCT/GB2009/000510 mailed Jul. 6, 2010 (16 pages).
International Search Report for PCT/GB2008/003958 mailed Sep. 4, 2009 (3 pages).
Banger et al., "Ternary single-source precursors for polycrystalline thin-film solar cells" Applied Organometallic Chemistry, 16:617-627, XP002525473 Scheme 1 Chemical Synthesis (2002).
D Qi, M Fischbein, M Drndic, S. Selmic, "Efficient polymer-nanocrystal quantum-dot photodetectors", Appl. Phys. Lett., 2004, 84, 4295.
Shen et al., "Photoacoustic and photoelectrochemical characterization of CdSe-sensitized Ti02 electrodes composed of nanotubes and nanowires" Thin Solid Films, Elsevier-Sequoia S.A. Lausanne, CH vol. 499, No. 1-2, Mar. 21, 2006, pp. 299-305, XP005272241 ISSN: 0040-6090.
Smestad GP, et al., "A technique to compare polythiophene solid-state dye sensitized Ti02 solar cells to liquid junction devices" Solar Energy Materials and Solar Cells, Elsevier Science Publishers, Amsterdam, NL, vol. 76, No. 1, Feb. 15, 2003, pp. 85-105, XP004400821 ISSN: 0927-0248.
Chen et al., "Electrochemically synthesized CdS nanoparticle-modified Ti02 nanotube-array photoelectrodes: Preparation, characterization, and application to photoelectrochemical cells" Journal of Photochemistry and Photobiology, a: Chemistry, Elsevier Sequoia Lausanne, CH, vol. 177, No. 2-3, Jan. 25, 2006, pp. 177-184, XP005239590 ISSN: 1010-6030.
Wang, et al., "In situ polymerization of amphiphilic diacetylene for hole transport in solid state dye-sensitized solar cells" Organic Electronics, El Sevier, Amsterdam NL, vol. 7, No. 6, Nov. 18, 2006, pp. 546-550, XP005773063 ISSN: 1566-1199.
International Search Report and Written Opinion for PCT/GB2008/001457 mailed Aug. 21, 2008 (14 pages).
Richardson et al., "Chemical Engineering: Chemical and Biochemical Reactors and Process Control," vol. 3, Third Edition, pp. 3-5 (1994).
Borchert et al., "High Resolution Photoemission STudy of CdSe and CdSe/ZnS Core-Shell Nanocrystals," Journal of Chemical Physics, vol. 119, No. 3, pp. 1800-1807 (2003).
Gaponik et al., "Thiol-Capping of CdTe Nanocrystals: An Alternative to Organometallic Synthetic Routes," Journal of Physical Chemistry B, vol. 106, No. 29, pp. 7177-7185 (2002).
Pickett et al., "Syntheses of Semiconductor Nanoparticles Using Single-Molecular Precursors," The Chemical Record, vol. 1 pp. 467-479 (2001).
Hu et al., Solar Cells: From basics to advanced systems. McGraw-Hill Book Co. pp. 73-74 (1983).
Talapin et al. "Synthesis of Surface-Modified Colloidal Semiconductor Nanocrystals and Study of Photoinduced Charge Separation and Transport in Nanocrystal-Polymer Composites," Physica E, vol. 14, pp. 237-241 (2002).
Search Report for GB0821122.9 searched Mar. 19, 2009 (2 pages).
Agger, J.R. et al., "Growth of Quantum-Confined Indium Phosphide inside MCM-41," J. Phys. Chem. B (1998) 102, p. 3345.
Aldana, J. et al. "Photochemical Instability of CdSe Nanocrystals Coated by Hydrophilic Thiols", J. Am. Chem. Soc. (2001), 123: 8844-8850.
Alivisatos, A.P. "Perspectives on the Physical Chemistry of Semiconductor Nanocrystals", J. Phys. Chem., (1996), 100, pp. 13226-13239.
Arici et al., "Hybrid Solar Cells Based on Inorganic Nanoclusters and Conjugated Polymers", Thin Solid Films 451-452 (2004) 612-618.
Barron, "Group III Materials: New Phases and Nono-particles with Applications in Electronics and Optoelectronics," Office of Naval Research Final Report (1999).
Battaglia et al., "Colloidal Two-dimensional Systems: CdSe Quantum Shells and Wells," Angew Chem. (2003) 115:5189.
Bawendi, M.G. The Quantum Mechanics of Larger Semiconductor Clusters ("Quantum Dots"), Annu. Rev. Phys. Chem. (1990), 42: 477-498.
Berry, C.R. "Structure and Optical Absorption of AgI Microcrystals", Phys. Rev. (1967) 161: 848-851.
Bunge, S.D. et al. "Growth and morphology of cadmium chalcogenides: the synthesis of nanorods, tetrapods, and spheres from CdO and $Cd(O_2CCH_3)_2$", J. Mater. Chem. (2003) 13: 1705-1709.
Castro et al., "Nanocrystalline Chalcopyrite Materials ($CuInS_2$ and $CuInSe_2$) via Low-Temperature Pyrolysis of Molecular Single-Source Precursors", Chem. Mater. (2003) 15:3142-3147.
Castro et al., "Synthesis and Characterization of Colloidal CuInS2 Nanoparticles from a Molecular Single-Source Precursors," J. Phys. Chem. B (2004) 108:12429.
Chun et al., "Synthesis of $CuInGaSe_2$ Nanoparticles by Solvothermal Route", Thin Solid Films 480-481 (2005) 46-49.
Contreras et al., "ZnO/ZnS(O,OH)/Cu(In,Ga)Se$_2$/Mo Solar Cell with 18:6% Efficiency," from 3d World Conf. on Photovol. Energy Conv., Late News Paper, (2003) pp. 570-573.
Cui et al., "Harvest of near infrared light in PbSe nanocrystal-polymer hybrid photovoltaic cells," Appl. Physics Lett. 88 (2006) 183111-183111-3.

Cumberland et al., "Inorganic Clusters as Single-Source Precursors for Preparation of CdSe, ZnSe, and CdSe/ZnS Nanomaterials" Chemistry of Materials, 14, pp. 1576-1584, (2002).

Dabousi et al., "(CdSe)ZnS Core—Shell Quantum Dots: Synthesis and Characterization of a Size Series of Highly Luminescent Nanocrystallites," Jrl. Phys. Chem.,(1997) 101, pp. 9463-9475.

Dance et al., "Syntheses, Properties, and Molecular and Crystal Structures of $(Me_4N)_4[E_4M_{10}(SPh)_{16}]$ (E=S, Se; M=Zn, Cd): Molecular Supertetrahedral Fragments of the Cubic Metal Chalcogenide Lattice", J. Am. Chem. Soc. (1984) 106:6285.

Daniels et al., "New Zinc and Cadmium Chalcogenide Structured Nanoparticles," Mat. Res. Soc. Symp. Proc. 789 (2004).

Dehnen et al., "Chalcogen-Bridged Copper Clusters," Eur. J. Inorg. Chem., (2002) pp. 279-317.

Eisenmann et al., "New Phosphido-bridged Multinuclear Complexes of Ag and Zn," Zeitschrift fur anorganische und allgemeine Chemi (1995). (1 page—abstract).

Eychmüller, A. et al. "A quantum dot quantum well: CdS/HgS/CdS", Chem. Phys. Lett. 208, pp. 59-62 (1993).

Fendler, J.H. et al. "The Colloid Chemical Approach to Nanostructured Materials", Adv. Mater. (1995) 7: 607-632.

Gao, M. et al. "Synthesis of PbS Nanoparticles in Polymer Matrices", J. Chem. Soc. Commun. (1994) pp. 2779-2780.

Gou et al., "Shape-Controlled Synthesis of Ternary Chalcogenide $ZnIn_2S_4$ and $CuIn(S,Se)_2$ Nano-/Microstructures via Facile Solution Route", J. Am. Chem. Soc. (2006) 128:7222-7229.

Gur et al., "Air stable all-inorganic nanocrystal solar cells processed from solution," Lawrence Berkeley Natl. Lab., Univ. of California, paper LBNL-58424 (2005).

Gurin, "Nanoparticles of Ternary Semiconductors in Colloids Low-Temperature Formation and Quantum Size Effects", Colloids Surf. A (1998) 142:35-40.

Guzelian, A. et al. "Colloidal chemical synthesis and characterization of InAs nanocrystal quantum dots", Appl. Phys. Lett. (1996) 69: 1432-1434.

Guzelian, A. et al., "Synthesis of Size-Selected, Surface-Passivated InP Nanocrystals", J. Phys. Chem. (1996) 100: 7212.

Hagfeldt, A. et al. "Light-induced Redox Reactions in Nanocrystalline Systems", Chem. Rev. (1995) 95: 49-68.

Henglein, A. "Small-Particle Research: Physicochemical Properties of Extremely Small Colloidal Metal and Semiconductor Particles", Chem Rev. (1989) 89: 1861-1873.

Hirpo et al., "Synthesis of Mixed Copper-Indium Chalcogenolates. Single-Source Precursors for the Photovoltaic Materials $CuInQ_2$ (Q=S, Se)," J. Am. Chem. Soc. (1993) 115:1597.

Hu et al., "Hydrothermal Preparation of $CuGaS_2$ Crystallites with Different Morphologies", Sol. State Comm. (2002) 121:493-496.

International Search Report for PCT/GB2005/001611 mailed Sep. 8, 2005 (5 pages).

Jegier, J.A. et al. "Poly(imidogallane): Synthesis of a Crystalline 2-D Network Solid and Its Pyrolysis to Form Nanocrystalline Gallium Nitride in Supercritical Ammonia", Chem. Mater. (1998) 10: 2041-2043.

Jiang et al., "Elemental Solvothermal Reaction to Produce Ternary Semiconductor $CuInE_2$ (E=S, Se) Nnaorods", Inorg. Chem. (2000) 39:2964-2965.

Kaelin et al., "CIS and CIGS layers from selenized nanoparticle precursors," Thin Solid Films 431-432 (2003) pp. 58-62.

Kapur et al., "Non-Vacuum processing of $CuIn_{1-x}GaxSe_2$ solar cells on rigid and flexible substrates using nanoparticle precursor inks," Thin Solid Films 431-432 (2003) pp. 53-57.

Kher, S. et al. "A Straightforward, New Method for the Synthesis of Nanocrystalline GaAs and GaP", Chem. Mater. (1994) 6: 2056-2062.

Kim et al., "Synthesis of $CuInGaSe_2$ Nanoparticles by Low Temperature Colloidal Route", J. Mech. Sci. Tech. (2005) 19:2085-2090.

Law et al., "Nanowire dye-sensitized solar cells," Nature Mater. (2005) vol. 4 pp. 455-459.

Li et al., "Synthesis by a Solvothermal Route and Characterization of $CuInSe_2$ Nanowhiskers and Nanoparticles", Adv. Mat. (1999) 11:1456-1459.

Lieber, C. et al. "Understanding and Manipulating Inorganic Materials with Scanning Probe Microscopes", Angew. Chem. Int. Ed. Engl. (1996) 35: 687-704.

Little et al., "Formation of Quantum-dot quantum-well heteronanostructures with large lattice mismatch: Zn/CdS/ZnS," 114 J. Chem. Phys. 4 (2001).

Lover, T. et al. "Preparation of a novel CdS nanocluster material from a thiophenolate-capped CdS cluster by chemical removal of SPh ligands", J. Mater. Chem. (1997) 7(4): 647-651.

Lu et al., "Synthesis of Nanocrystalline $CuMS_2$ (M=In or Ga) Through a Solvothermal Process", Inorg. Chem. (2000) 39:1606-1607.

Malik et al., "A Novel Route for the Preparation of CuSe and $CuInSe_2$ Nanoparticles", Adv. Mat., (1999) 11:1441-1444.

Matijevic, E. "Production of Mondispersed Colloidal Particles", Ann. Rev. Mater. Sci. (1985) 15: 483-518.

Matijevic, E., "Monodispersed Colloids: Art and Science", Langmuir (1986) 2:12-20.

Mekis, I. et al., "One-Pot Synthesis of Highly Luminescent CdSe/CdS Core-Shell Nanocrystals via Organometallic and "Greener" Chemical Approaches", J. Phys. Chem. B. (2003) 107: 7454-7462.

Mews et al., "Preparation, Characterization, and Photophysics of the Quantum Dot Quantum Well System CdS/HgS/CdS", J. Phys. Chem. (1994) 98:934.

Mićić et al., "Synthesis and Characterization of InP, GaP, and $GaInP_2$ Quantum Dots", J. Phys. Chem. (1995) pp. 7754-7759.

Milliron et al., "Electroactive Surfactant Designed to Mediate Electron Transfer between CdSe Nanocrystals and Organic Semiconductors," Adv. Materials (2003) 15, No. 1, pp. 58-61.

Murray, C.B. et al., "Synthesis and Characterization of Nearly Monodisperse CdE (E=S, Se, Te) Semiconductor Nanocrystallites", J. Am. Chem. Soc. (1993) 115 (19) pp. 8706-8715.

Müller et al., "From Giant Molecular Clusters and Precursors to Solid-state Structures," Current Opinion in Solid State and Materials Science, 4 (Apr. 1999) pp. 141-153.

Nairn et al., "Preparation of Ultrafine Chalcopyrite Nanoparticles via the Photochemical Decomposition of Molecular Single-Source Precursors", Nano Letters (2006) 6:1218-1223.

Nazeeruddin et al., "Conversion of Light to Electricity by cis-$X_2Bis(2,2'$-bipyridyl-4,4'-dicarboxylate)ruthenium(II) Charge-Transfer Sensitizers (X=Cl⁻, Br⁻, I⁻, CN⁻, and SCN⁻) on Nanocrystalline $TiO_2$ Electrodes," J. Am. Chem. Soc. (1993) 115:6382-6390.

Nazeeruddin et al., "Engineering of Efficient Panchromatic Sensitizers for Nanocrystalline $TiO_2$-Based Solar Cells," J. Am. Chem. Soc. (2001) 123:1613-1624.

O'Brien et al., "The Growth of Indium Selenide Thin Films from a Novel Asymmetric Dialkydiselenocarbamate," 3 Chem. Vap. Depos. 4, pp. 227 (1979).

Olshavsky, M.A., et al. "Organometallic Synthesis of GaAs Crystallites Exhibiting Quantum Confinement", J. Am. Chem. Soc. (1990) 112: 9438-9439.

Olson et al., "Effect of Polymer Processing on the Performance of Poly(3-hexylthiophene)/ZnO Nnaorod Photovoltaic Devices", J. Phys. Chem. C. (2007) 111:16640-16645.

Patent Act 1977 Search Report under Section 17 for Application No. GB0522027.2 dated Jan. 27, 2006 (1 page).

Patent Act 1977 Search Report under Section 17 for Application No. GB0606845.6 dated Sep. 14, 2006.

Patent Act 1977 Search Report under Section 17 for Application No. GB0719073.9.

Patent Act 1977 Search Report under Section 17 for Application No. GB0719075.4.

Patent Act 1977 Search Report under Section 17 for Application No. GB0723539.3 dated Mar. 27, 2008 (1 page).

Patents Act 1977: Search Report under Section 17 for Application No. GB0409877.8 dated Oct. 7, 2004 (2 pages).

Peng et al., "Kinetics of I-VI and III-V Colloidal Semiconductor Nanocrystal Growth: "Focusing" os Size Distributions", J. Am. Chem. Soc., (1998) 129: 5343-5344.

Peng et al., "Mechanisms of the Shape Evolution of CdSe Nanocrystals", J. Am. Chem. Soc. (2001) 123:1389.

Peng et al., "Shape control of CdSe nanocrystals", Nature (2000) vol. 404, No. 6773, pp. 59-61.

Pradhan, N. et al. "Single-Precursor, One-Pot Versatile Synthesis under near Ambient Conditions of Tunable, Single and Dual Band Flourescing Metal Sulfide Nanoparticles", J. Am. Chem. Soc. (2003) 125: 2050-2051.

Qi et al., "Efficient polymer-nanocrystal quantum-dot photodetectors," Appl. Physics Lett. 86 (2005) 093103-093103-3.

Qu, L. et al. "Alternative Routes toward High Quality CdSe Nanocrystals", Nano Lett. (2001) vol. 1, No. 6, pp. 333-337.

Robel et al., "Quantum Dot Solar Cells. Harvesting Light Energy with CdSe Nanocrystals Molecularly Linked to Mesoscopic $TiO_2$ Films," J. Am. Chem. Soc. (2006) 128: 2385-2393.

Salata, O.V. et al. "Uniform GaAs quantum dots in a polymer matrix", Appl. Phys. Letters (1994) 65(2): 189-191.

Sercel, P.C. et al. "Nanometer-scale GaAs clusters from organometallic percursors", Appl. Phys. Letters (1992) 61: 696-698.

Shulz et al., "Cu-In-Ga-Se Nanoparticle Colloids as Spray Deposition Precursors for $Cu(In,Ga)Se_2$ Solar Cell Materials", J. Elect. Mat. (1998) 27:433-437.

Steigerwald, M.L. et al. "Semiconductor Crystallites: A Class of Large Molecules", *Acc. Chem. Res.* (1990) 23: 183-188.

Stroscio, J.A. et al. "Atomic and Molecular Manipulation with the Scanning Tunneling Microscope", Science (1991), 254: 1319-1326.

Timoshkin, "Group 13 imido metallanes and their heavier analogs $[RMYR']_n$ (M=Al. Ga, In; Y=N, P, As, Sb)," Coordination Chemistry Reviews 2005.

Trinidade et al., "A Single Source Spproach to the Synthesis of CdSe Nanocrystallites", *Advanced Materials*, (1996) vol. 8, No. 2, pp. 161-163.

Vayssieres et al., "Highly Ordered $SnO_2$ Nanorod Arrays from Controlled Aqueous Growth," Angew. Chem. Int. Ed. (2004) 43: 3666-3670.

Vittal, "The chemistry of inorganic and organometallic compounds with adameantane-like structures," Polyhedron, vol. 15, No. 10, pp. 1585-1642 (1996).

Wang Y. et al. "PbS in polymers, From molecules to bulk solids", J. Chem. Phys. (1987) 87: 7315-7322.

Weller, H. "Colloidal Semiconductor Q-Particles: Chemistry in the Transition Region Between Solid State and Molecules", Angew. Chem. Int. Ed. Engl. (1993) 32: 41-53.

Weller, H. "Quantized Semiconductor Particles: A Novel State of Mater for Materials Science", Adv. Mater. (1993) 5: 88-95.

Wells, R.L. et al. "Synthesis of Nanocrystalline Indium Arsenide and Indium Phosphide from Indium(III) Halides and Tris (trimethylsilyl)pnicogens. Synthesis, Characterization, and Decomposition Behavior of $I_3In-P(SiMe_3)_3$", Chem. Mater. (1995) 7: 793-800.

Xiao et al., "A Mild Solvothermal Route to Chalcopyrite Quaternary Semiconductor $CuIn(Se_xS_{1-x})_2$ Nanocrystallites", J. Mater. Chem. (2001) 11:1417-1420.

Yang et al., "Studies of Electrochemical Synthesis of Ultrathin ZnO Nanorod/Nanobelt Arrays on Zn Substrates in Alkaline Solutions of Amine-Alcohol Mixtures", Crystal Growth & Design (2007) 12:2562-2567.

Yu et al., "Polymer Photovoltaic Cells: Enhanced Efficiencies via a Network of Internal Donor-Acceptor Heterojunctions," 270 Science 5243 (1995), pp. 1789-1791.

Zhong et al, "Composition-Tunable $Zn_xCu_1$-$x$Se Nanocrytals with High Luminescence and Stability", Jrl Amer. Chem. Soc. (2003).

Zhong et al., "A Facile Route to Synthesize Chalcopyrite $CuInSe_2$ Nanocrystals in Non-Coordinating Solvent", Nanotechnology 18 (2007) 025602.

Trinidade et al., "Nanocrystalline Seminconductors: Synthesis, Properties, and Perspectives", Chemistry of Materials, (2001) vol. 13, No. 11, pp. 3843-3858.

Materials Research Society Symposium Proceedings *Quantum Dots, Nanoparticles and Nanowires*, 2004, ISSN: 0272-9172.

International Search Report for PCT/GB2006/003028 mailed Jan. 22, 2007 (5 pages).

Nielsch et al., "Uniform Nickel Deposition into Ordered Alumina Pores by Pulsed Electrodeposition", *Advanced Materials*, 2000 vol. 12, No. 8, pp. 582-586.

Huang et al., "Bio-Inspired Fabrication of Antireflection Nanostructures by Replicating Fly Eyes", *Nanotechnology* (2008) vol. 19.

Rao et al. (2004) "The Chemistry of Nanomaterials: Synthesis, Properties and Applications" p. 443.

Xie et al. "Synthesis and Characterization of Highly Luminescent CdSe-Core CdS/Zn0.5Cd0.5S/ZnS Multishell Nanocrystals" JACS Articles published on web Apr. 29, 2005.

Kim et al. "Engineering $InAs_xP_{1-x}$/InP/ZnSe III-V Alloyed Core-Shell Quantum Dots for the Near-Infrared" JACS Articles published on web Jul. 8, 2005.

Prior art

Figure 1

Prior art

Figure 2

Prior art

Figure 3

SURFACE FUNCTIONALISED NANOPARTICLES

RELATED APPLICATIONS

This application claims the benefit of and priority to copending U.S. Provisional Patent Application Ser. No. 61/111,093 filed Nov. 4, 2008, and GB 0820101.4 filed Nov. 4, 2008, the disclosures of which are incorporated herein by reference in their entireties.

FIELD OF THE INVENTION

The present invention relates to a process for the production of surface functionalised nanoparticles, particularly but not exclusively, the production of semiconductor quantum dot nanoparticles incorporating surface-bound functional groups that increase the ease with which the dots may be employed in applications, such as incorporation into solvents, inks, polymers, glasses, metals, electronic materials and devices, bio-molecules and cells.

BACKGROUND

The size of a semiconductor nanoparticle generally dictates the electronic properties of the material, the band gap energy being inversely proportional to the size of the semiconductor nanoparticle as a consequence of quantum confinement effects. In addition, the large surface-area-to-volume ratio of the nanoparticle may have a profound impact upon the physical and chemical properties of the nanoparticle.

Two fundamental factors, both related to the size of the individual semiconductor nanoparticle, are primarily responsible for their unique properties. The first is the large surface-to-volume ratio: as a particle becomes smaller, the ratio of the number of surface atoms to those in the interior increases. This leads to the surface properties playing an important role in the overall properties of the material. The second factor is that, with many materials including semiconductor nanoparticles, the electronic properties of the material change with size. Moreover, because of quantum confinement effects, the band gap typically gradually becomes larger as the size of the particle decreases. This effect is a consequence of the confinement of an 'electron in a box' giving rise to discrete energy levels similar to those observed in atoms and molecules, rather than a continuous band as observed in the corresponding bulk semiconductor material. Thus, for a semiconductor nanoparticle, because of the physical parameters, the "electron and hole", produced by the absorption of electromagnetic radiation, a photon, with energy greater then the first excitonic transition, are closer together than they would be in the corresponding macrocrystalline material. Moreover, the Coulombic interaction cannot be neglected. This may lead to a narrow bandwidth emission that is dependent upon the particle size and composition of the nanoparticle material. Thus, quantum dots generally have higher kinetic energy than the corresponding macrocrystalline material and consequently the first excitonic transition (band gap) increases in energy with decreasing particle diameter.

Core semiconductor nanoparticles that consist of a single semiconductor material along with an outer organic passivating layer tend to have relatively low quantum efficiencies due to electron-hole recombination occurring at defects and dangling bonds situated on the nanoparticle surface that can lead to non-radiative electron-hole recombinations.

One method to eliminate defects and dangling bonds on the inorganic surface of the quantum dot is to grow a second inorganic material, having a wider band-gap and small lattice mismatch to that of the core material epitaxially on the surface of the core particle, to produce a "core-shell" particle. Core-shell particles separate any carriers confined in the core from surface states that would otherwise act as non-radiative recombination centres. One example is ZnS grown on the surface of CdSe cores.

Another approach is to prepare a core-multi shell structure where the "electron-hole" pair is completely confined to a single shell layer consisting of a few monolayers of a specific material such as a quantum dot-quantum well structure. Here, the core is of a wide bandgap material, followed by a thin shell of narrower bandgap material, and capped with a further wide bandgap layer, such as CdS/HgS/CdS grown using substitution of Hg for Cd on the surface of the core nanocrystal to deposit just a few monolayers of HgS that is then over grown by monolayers of CdS. The resulting structures exhibited clear confinement of photo-excited carriers in the HgS layer.

To add further stability to quantum dots and to help confine the electron-hole pair one of the most common approaches is to epitaxially grow a compositionally graded alloy layer on the core. This can help to alleviate strain that may otherwise led to defects. Moreover, for a CdSe core, in order to improve structural stability and quantum yield, rather than growing a shell of ZnS directly on the core, a graded alloy layer of $Cd_{1-x}Zn_xSe_{1-y}S_y$ may be used. This has been found to greatly enhance the photoluminescence emission of the quantum dots.

Doping quantum dots with atomic impurities may be an efficient way of also manipulating the emission and absorption properties of the nanoparticle. Procedures for doping of wide band gap materials, such as zinc selenide and zinc sulphide with manganese and copper (ZnSe:Mn or ZnS:Cu), have been developed. Doping with different luminescence activators in a semiconducting nanocrystal can tune the photoluminescence and electroluminescence at energies even lower than the band gap of the bulk material, whereas the quantum size effect can tune the excitation energy with the size of the nanocrystals without causing a significant change in the energy of the activator related emission.

The coordination about the final inorganic surface atoms in any core, core-shell or core-multi shell, doped or graded nanoparticle is incomplete, with highly reactive, non-fully coordinated atoms "dangling bonds" on the surface of the particle, that can lead to particle agglomeration. This problem may be overcome by passivating (also referred to as "capping") the "bare" surface atoms with protecting organic groups.

Figure 1:
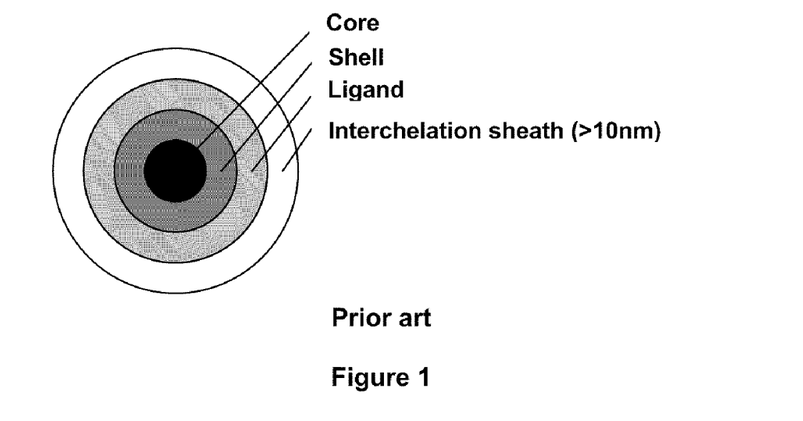
FIG. 1 is a schematic illustration of a prior art core-shell quantum dot nanoparticle incorporating an interchelated surface ligand.

An outermost layer of organic material or sheath material (referred to as a "capping agent") helps to inhibit particle aggregation and protects the nanoparticles from their surrounding electronic and, chemical environment. A schematic illustration of such a nanoparticle is provided in FIG. 1. In many cases, the capping agent is the solvent in which the nanoparticle preparation is undertaken, and includes a Lewis base compound or a Lewis base compound diluted in an inert solvent, such as a hydrocarbon. The lone pair of electrons on the Lewis base capping agent are capable of a donor-type coordination to the surface of the nanoparticles. Suitable Lewis base compounds include mono- or multi-dentate ligands, such as phosphines (trioctylphosphine, triphenolphosphine, t-butylphosphine), phosphine oxides (trioctylphosphine oxide), alkyl phosphonic acids, alkyl-amines (hexadecylamine, octylamine), aryl-amines, pyridines, long chain fatty acids and thiophenes, but is not restricted to these materials.

The widespread exploitation of quantum dot nanoparticles has been restricted by their physical/chemical instability and incompatibility with many applications. In particular, the inability to find acceptable methods of incorporating nanoparticles into silicone polymers has severely limited the use of nanoparticles in electronic devices. Consequently, a series of surface modification procedures has been employed to render the quantum dots more stable and compatible with a desired application. This has been attempted mainly by making the capping agent bi- or multi functional or by overcoating the capping layer with an additional organic layer that has functional groups that can be used for further chemical linkage.

Figure 2:
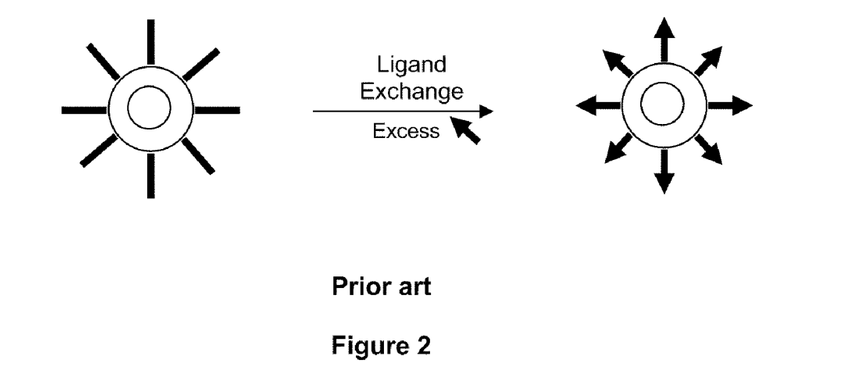
FIG. 2 is a schematic illustration of the prior art process of ligand exchange.

The most widely used quantum dot surface modification procedure is known as 'ligand exchange'. The ligand molecules that inadvertently coordinate to the surface of the quantum dot during the core synthesis and shelling procedure are subsequently exchanged with a ligand compound that introduces a desired property or functional group. Inherently, this ligand exchange strategy reduces the quantum yield of the quantum dots considerably. This process is illustrated schematically in FIG. 2.

Figure 3:
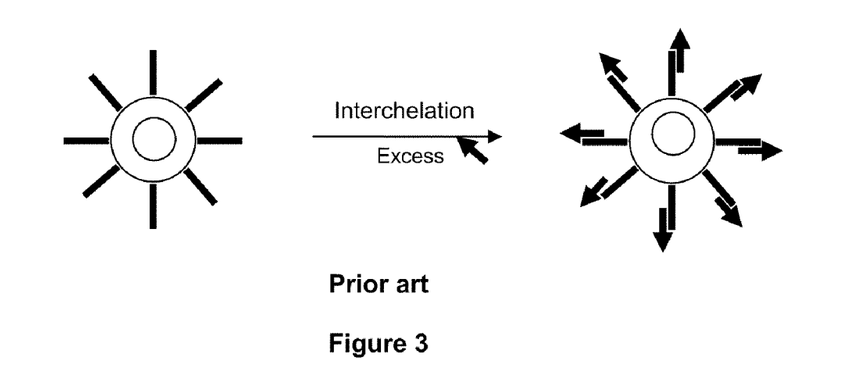
FIG. 3 is a schematic illustration of the prior art process of ligand interchelation.

An alternative surface modification strategy interchelates discrete molecules or polymer with the ligand molecules that are already coordinated to the surface of the quantum dot during the shelling procedure. These post synthesis interchelation strategies often preserve the quantum yield but result in quantum dots of substantially larger size. This process is illustrated schematically in FIG. 3.

Current ligand exchange and interchelation procedures may render the quantum dot nanoparticles more compatible with their desired application but usually result in lower quantum yield due to damage to the inorganic surface of the quantum dots and/or an increase in the size of the final nanoparticles. Moreover, an economically viable method for producing surface functionalised nanoparticles suitable for incorporation into silicone polymers has still to be realised.

SUMMARY

Embodiments of the present invention may obviate or mitigate one or more of the problems described above.

Some embodiments of the invention feature a method for producing surface functionalised nanoparticles for incorporation into a silicone polymer material. The method includes reacting growing nanoparticles with a nanoparticle surface binding ligand incorporating a nanoparticle binding group and a silicone polymer binding group, the reaction being effected under conditions permitting binding of the surface binding ligand to the growing nanoparticles to produce the surface functionalised nanoparticles.

The growing nanoparticles may be synthesised under conditions permitting binding of the surface binding ligand to the growing nanoparticles to produce the surface functionalised nanoparticles. In some embodiments, the silicone polymer binding group of the surface binding ligand includes a crosslinkable and/or a polymerizable group.

The silicone binding group of the surface binding ligand may include at least one unsaturated alkyl group and/or two or more vinyl groups. The nanoparticle binding group of the surface binding ligand may contain (i) an atom such as sulfur, nitrogen, oxygen, and/or phosphorous, (ii) a species such as thiol, an acid group, an ester group, and salts thereof, and/or (iii) a species such as hydroxide, hydroxide salt, alkoxide, alkoxide salt, carboxylic acid, carboxylate ester, carboxylate salt, amine, ammonium salt, nitro, polyethyleneglycol, sulfonic acid, sulfonate ester, sulfonate salt phosphoric acid, phosphate ester, and/or phosphate salt.

The nanoparticle binding group and the silicone polymer binding group of the surface binding ligand may be connected via a linker, such as a covalent bond; a carbon, nitrogen, oxygen or sulfur atom; a substituted or unsubstituted, saturated or unsaturated aliphatic or alicyclic group; and/or a substituted or unsubstituted aromatic group.

The reaction may be carried out in a solvent that is different from the nanoparticle surface binding ligand. The solvent may be a Lewis base compound, such as HDA, TOP, TOPO, DBS, and/or octanol.

The nanoparticles may be semiconductor nanoparticles; they may include at least one semiconductor material selected from the group consisting of CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge, MgS, MgSe, MgTe, and combinations thereof.

The nanoparticles may be core, core-shell and/or core-multishell nanoparticles.

A surface functionalised nanoparticle may be produced using any one of the above methods. More generally, the surface functionalised nanoparticle includes a nanoparticle bound to a nanoparticle surface binding ligand, the ligand incorporating a nanoparticle binding group and a silicone polymer binding group.

DETAILED DESCRIPTION

1. Synthetic Approach

According to a first aspect of the present invention a method is provided for producing surface functionalised nanoparticles for incorporation into a silicone polymer material, the method including reacting growing nanoparticles with a nanoparticle surface binding ligand incorporating a nanoparticle binding group and a silicone polymer binding group, the reaction being effected under conditions permitting binding of the surface binding ligand to the growing nanoparticles to produce the surface functionalised nanoparticles.

Embodiments of the present invention include a method for providing a functionalised layer on the outer surface of a nanoparticle that is suitable for binding to a silicone polymer. Even though this has seemingly proved difficult in the past, it has surprisingly been found that nanoparticles can in fact be combined with a pre-functionalised nanoparticle surface binding ligand containing a silicone polymer binding group without harming the ability of the surface binding ligand to bind to the surface of the nanoparticles or the ability of the other functional group to bind to a silicone polymer.

Embodiments of the present invention thus provide a strategy for intentionally coordinating a chosen pre-chemically functionalised ligand to the surface of a quantum dot nanoparticle in-situ and thereby generate quantum dot nanoparticles that are physically/chemically robust, have high quantum yield, have small diameter and, importantly are ready for incorporation into silicone polymers which then facilitates the use of such quantum dots in electronic devices such as LEDs.

Preferably the method includes synthesising the growing nanoparticles in the nanoparticle surface binding ligand under conditions permitting binding of the surface binding ligand to the growing nanoparticles to produce the surface functionalised nanoparticles.

In an embodiment, the present invention provides a method for producing surface functionalised nanoparticles for incorporation into a silicone polymer material, the method including synthesising nanoparticles in a nanoparticle surface binding ligand incorporating a nanoparticle binding group and a silicone polymer binding group under conditions permitting binding of the surface binding ligand to the growing nanoparticles during synthesis to produce the surface functionalised nanoparticles.

Embodiments of the present invention facilitate synthesis of nanoparticles in a capping agent that has a nanoparticle binding group that can passivate the surface of the nanoparticle and an additional ligand that has the ability for further chemical linkage, such as cross linking about the nanoparticle or incorporation within polymeric materials.

The growing nanoparticles may be pre-formed nanoparticle cores on to which one or more shell layers are being grown in the presence of the nanoparticle surface binding ligand as in the Example set out below, or the growing nanoparticles may be growing nanoparticle cores produced by an appropriate combination of core precursor materials.

2. The Nanoparticles

In a first preferred embodiment of the method forming the first aspect of the present invention the nanoparticle contains a first ion and a second ion. The first and second ions may be selected from any desirable group of the periodic table, such as but not limited to group 11, 12, 13, 14, 15 or 16 of the periodic table. The first and/or second ion may be a transition metal ion or a d-block metal ion. Preferably the first ion is selected from group 11, 12, 13 or 14 and the second ion is selected from group 14, 15 or 16 of the periodic table. Surface functionalised nanoparticles produced according to the first aspect of the present invention are preferably semiconductor nanoparticles, for example, core nanoparticles, core-shell nanoparticles, graded nanoparticles or core-multishell nanoparticles incorporating the desired surface functionalisation.

3. Suitable Solvents

The reaction between the growing nanoparticles and the ligand may be carried out in any appropriate solvent. The reaction is preferably carried out in a solvent that is different from the nanoparticle surface binding ligand, although it will be appreciated that this does not have to be the case, and that in alternative embodiments, the surface binding ligand may represent the solvent or one of the solvents in which the reaction is being conducted. The solvent may be a co-ordinating solvent (i.e., a solvent that co-ordinates the growing nanoparticles) or a non-co-ordinating solvent (i.e., a solvent that does not co-ordinate the growing nanoparticles). Preferably the solvent is a Lewis base compound such as, e.g., HDA, TOP, TOPO, DBS, octanol, and the like.

4. The Nanoparticle Surface Binding Ligand

The nanoparticle binding group of the surface binding ligand is preferably different to the silicone binding group. The silicone binding group may or may not incorporate a protecting group chosen so as to be selectively removable.

The nature of the silicone binding group of the surface binding ligand may be chosen to bestow any desirable chemical or physical property to the final surface functionalised nanoparticles provided it retains the ability to bind to a silicone polymer. For example, a ligand may be chosen that contains a silicone binding group which, in addition to enabling the bound nanoparticles to be incorporated into a silicone polymer, bestows the surface functionalised nanoparticles with a predetermined reactivity towards a particular reagent. Alternatively, a ligand may be chosen that incorporates a silicone binding group which bestows aqueous compatibility (i.e., the ability to be stably dispersed or dissolved in aqueous media) to the surface functionalised nanoparticles as well as the ability to cross-link with silicone polymers that incorporate compatible cross-linkable groups.

The surface binding ligand may contain any appropriate nanoparticle binding group to bind to the nanoparticles. Preferably the nanoparticle binding group contains an atom such as, e.g., sulfur, nitrogen, oxygen, and/or phosphorous. The nanoparticle binding group may contain a species selected from the group consisting of a thio group, an amino group, an oxo group and a phospho group. The nanoparticle binding group may be selected from the group consisting of hydroxide, alkoxide, carboxylic acid, carboxylate ester, amine, nitro, polyethyleneglycol, sulfonic acid, sulfonate ester, phosphoric acid and phosphate ester. Moreover, the nanoparticle binding group may be a charged or polar group, such as but not limited to a hydroxide salt, alkoxide salt, carboxylate salt, ammonium salt, sulfonate salt and/or phosphate salt.

The nanoparticle binding group and the silicone polymer binding group of the surface binding ligand are preferably connected via a linker, that may take any desirable form. It is particularly preferred that the linker is, e.g., a covalent bond; a carbon, nitrogen, oxygen or sulfur atom; a substituted or unsubstituted, saturated or unsaturated aliphatic or alicyclic group; and a substituted or unsubstituted aromatic group.

Embodiments of the present invention include methods for producing surface functionalised nanoparticles that can be incorporated into a silicone polymer and are also physically/chemically robust, have high quantum yield, have small diameters, and are compatible with their intended application. Nanoparticles produced according to embodiments of the present invention may be represented by Formula 1 below.

QD—X—Y—Z <span style="float:right">Formula 1</span> where QD represents a core or core-(multi)shell nanoparticle, and X—Y—Z represents the nanoparticle surface binding ligand in which X is a nanoparticle surface binding group, Y is a linker group linking X and Z, and Z is a functional group that can bind to a silicone polymer.

X and/or Z may be substituted or unsubstituted alkyl, substituted or unsubstituted aryl, substituted or unsubstituted heterocyclic, substituted or unsubstituted polyethyleneglycol (examples of substituents include but are not limited to halogen, ether, amine, amide, ester, nitrile, isonitrile, aldehyde, carbonate, ketone, alcohol, carboxylic acid, azide, imine, enamine, anhydride, acid chloride, alkyne, thiol, sulfide, sulfone, sulfoxide, phosphine, phosphine oxide).

X and/or Z may be a charged or polar group, such as a hydroxide salt, alkoxide salt, carboxylate salt, ammonium salt, sulfonate salt or phosphate salt.

X and/or Z may be, e.g., —SR$^1$ (R$^1$=H, alkyl, aryl); —OR$^2$ (R$^2$=H, alkyl, aryl); —NR$^3$R$^4$ (R$^3$ and/or R$^4$=H, alkyl, aryl); —CO$_2$R$^5$ (R$^5$=H, alkyl, aryl); —P(=O)OR$^6$OR$^7$ (R$^6$ and/or R$^7$=H, alkyl, aryl); —OR$^8$ where R$^8$ is hydrogen or an alkyl group that may be substituted or unsubstituted, and/or saturated or unsaturated; —C(O)OR$^9$ where R$^9$ is hydrogen, a substituted or unsubstituted, saturated or unsaturated aliphatic or alicyclic group, or a substituted or unsubstituted aromatic group; —NR$^{10}$R$^{11}$ where R$^{10}$ and R$^{11}$ are independently hydrogen, a substituted, or unsubstituted, saturated or unsaturated aliphatic or alicyclic group, or a substituted or unsubstituted aromatic group, or R$^{10}$ and R$^{11}$ may be linked such that —NR$^{10}$R$^{11}$ forms a nitrogen-containing heterocyclic ring of any desirable size, e.g., a five, six or seven-membered ring; —N$^+$R$^{12}$R$^{13}$R$^{14}$ where R$^{12}$, R$^{13}$ and R$^{14}$ are independently hydrogen, a substituted or unsubstituted, saturated or unsaturated aliphatic or alicyclic group, or a substituted or unsubstituted aromatic group; —NO$_2$;

where R$^{15}$ is hydrogen, a substituted or unsubstituted, saturated or unsaturated aliphatic or alicyclic group, or a substituted or unsubstituted aromatic group; —S(O)$_2$OR$^{16}$ where R$^{16}$ is hydrogen, a substituted or unsubstituted, saturated or unsaturated aliphatic or alicyclic group, or a substituted or unsubstituted aromatic group; and —P(OR$^{17}$)(OR$^{18}$)O where R$^{17}$ and R$^{18}$ are independently hydrogen, a substituted or unsubstituted, saturated or unsaturated aliphatic or alicyclic group, or a substituted or unsubstituted aromatic group.

Z may incorporate any appropriate protecting group. By way of example, Z may contain an acid labile protecting group, such as t-butyl, benzylic, trityl, silyl, benzoyl, fluorenyl, acetal, ester, or ethers, e.g., methoxymethyl ether, 2-methoxy(ethoxy)methyl ether. Alternatively, Z may contain a nucleophillic-base labile protecting group, including a carboxylic ester, sulfonium salt, amide, imide, carbamate, N-sulfonamide, trichloroethoxymethyl ether, trichloroethylester, trichloroethoxycarbonyl, allylic-ether/ amine/acetal/ carbonate/ester/carbamate to protect a carboxylic acid, alcohol, thiol, etc. Moreover, Z may incorporate a benzyl amine protecting group, that can be deprotected to provide an amine group, or Z may contain a cyclic carbonate when it is ultimately desirable to deprotect Z to provide a diol for further reaction.

Y may be a single bond, alkyl, aryl, heterocyclic, polyethyleneglycol, substituted or unsubstituted alkyl, substituted or unsubstituted aryl, substituted or unsubstituted heterocyclic, substituted or unsubstituted polyethyleneglycol, (examples of substituents include halogen, ether, amine, amide, ester, nitrile, isonitrile, aldehyde, carbonate, ketone, alcohol, carboxylic acid, azide, imine, enamine, anhydride, acid chloride, alkyne, thiol, sulfide, sulfone, sulfoxide, phosphine, phosphine oxide), a crosslinkable/polymerisable group (examples include carboxylic acid, amine, vinyl, alkoxysilane, epoxide), or a group represented by Formula 2 below Formula 2 where k, m and n are each independently any number from 0 to around 10,000.

X and/or Z may be the same or different. X may be any of the groups specified above with respect to the nanoparticle binding group, for example X may be an acid group or an ester group, such as a carboxylic acid group or derivative or salt thereof, such as a carboxylate ester or carboxylate salt. In alternative embodiments, X may be a sulfonic acid group, sulfonate ester or salt; or a phosphoric acid group, phosphate ester or salt; or an amino group. Z preferably includes one or more alkyl group, each containing at least one unsaturated group for connection to the silicone polymer. The or each carbon-to-carbon double or triple bond may be a terminal unsaturated group (i.e., include an atom at the end of a carbon chain) or be provided within the carbon chain. Where Z includes one or more alkyl groups, the or each alkyl chain may carry any desirable substituent(s). The linker group, Y, connecting X and Z may take any convenient form. For example, Y may contain one or more aliphatic groups and/or an aromatic groups. The aliphatic group(s) may contain a straight carbon chain, a branched carbon chain, or may be alicyclic. Y may further include one or more ether groups. In a particularly preferred embodiment, Y includes a phenyl group bound to at least one, more preferably two or three, unsaturated alkyl groups optionally via ether links. A particularly preferred nanoparticle surface binding ligand (Ligand 1) has the structure shown below, that can cross-link to other ligands and/or surrounding species (e.g., compatible polymers or polymerizable monomers) via the three vinyl groups.

Ligand 1

Further preferred cross-linkable ligands of Formula 1 that can be used embodiments of the method according to the present invention are shown below and incorporate a functional group, Z, which contains one or more vinyl groups bonded to an aliphatic or aromatic linker, Y, which is bonded to a nanoparticle binding ligand, X, of any desirable structure, such as those described above. Preferred ligands incorporate one vinyl group, more preferably two vinyl groups, and most preferably three or more vinyl groups. When Z contains two or more vinyl groups, then the vinyl groups may be bonded via respective alkyl groups to the same carbon atom, or to different carbon atoms (e.g., different carbon atoms of the same carbocyclic or heterocyclic ring, which may itself be saturated, partially saturated or aromatic). Nanoparticle binding group, X, may be monodentate or multidentate as described above. By way of example, X may incorporate one carboxylic acid group, as in Ligand 1, or X may incorporate two, three or more carboxylic acid groups. When two or more carboxylic acid groups are present, each group may be bonded via an alkyl group to the same or different carbon atoms.

Exemplary monodentate aliphatic ligands include the following, where X is a carboxylic acid group, Z includes one, two or three vinyl groups, Y is a straight or branched aliphatic group, and each x is any integer (i.e., 0, 1, 2, 3 etc).

Exemplary monodentate aromatic ligands include the following, where X is a carboxylic acid group, Z includes one, two or three vinyl groups, Y contains an aromatic group, and each x is any integer (i.e., 0, 1, 2, 3 etc).

Exemplary bidentate aliphatic ligands include the following, where X contains two carboxylic acid groups, Z includes one, two or three vinyl groups, Y is a straight or branched aliphatic group, and each x is any integer (i.e., 0, 1, 2, 3, etc.).

Exemplary tridentate aliphatic ligands include the following, where X contains three carboxylic acid groups, Z includes one, two or three vinyl groups, Y is a straight or branched aliphatic group, and each x is any integer (i.e., 0, 1, 2, 3, etc.).

It will be appreciated that one or more of the carboxylic acid groups in any of the above exemplary structures may be replaced with an alternative nanoparticle binding group, such as, but not limited to, a carboxylic acid salt or ester, a sulfonic acid, ester or salt, a phosphoric acid, ester or salt, or an amino group. Moreover, linker group, Y, may contain groups other than the specific unsaturated aliphatic or aromatic groups shown above. For example, Y may incorporate one or more ether groups, carbon-to-carbon double bonds, and/or multicyclic aromatic or non-aromatic groups.

In a preferred embodiment, a method is provided according to the first aspect of the present invention, where the nanoparticle surface binding ligand incorporates a terminal unsaturated group in the form of a vinyl group. That is, the nanoparticle surface binding ligand incorporates a carbon-to-carbon double bond at the end of the ligand furthest away from the nanoparticle surface.

X may include at least one carboxylic acid group or at least one thiol group. Y may include a straight or branched aliphatic group, or an aromatic group.

With regard to the first aspect of the present invention, the nanoparticle surface binding ligand may be poly(oxyethylene glycol)$_n$ monomethyl ether acetic acid where n=around 1 to around 5000. Preferably n is around 50 to 3000, more preferably around 250 to 2000, and most preferably around 350 to 1000. Alternatively, the nanoparticle surface binding ligand may be selected from the group consisting of 10-Undecylenic acid and 11-mercapto-undecene. As a further preferred alternative, the nanoparticle surface binding ligand is Ligand 1 as shown above.

5. Surface Functionalised Nanoparticles

A second aspect of the present invention provides a surface functionalised nanoparticle produced using the method according to the first aspect of the present invention, the surface functionalised nanoparticle including a nanoparticle bound to a nanoparticle surface binding ligand, the ligand incorporating a nanoparticle binding group and a silicone polymer binding group.

Nanoparticles produced according to the first aspect of the present invention are preferably semiconductor nanoparticles, for example, core nanoparticles, core-shell nanoparticles, graded nanoparticles or core-multishell nanoparticles. The nanoparticles preferably include one or more ions selected from any suitable group of the periodic table, such as but not limited to group 11, 12, 13, 14, 15 or 16 of the periodic table, transition metal ions and/or d-block metal ions. The nanoparticle core and/or shell (where applicable) may incorporate one or more semiconductor material, such as but not limited to CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge, MgS, MgSe, MgTe, and combinations thereof.

Embodiments of the present invention include a strategy that intentionally coordinates a chosen pre-chemically functionalised ligand to the surface of the quantum dot nanoparticle in-situ and generates quantum dot nanoparticles that are physically/chemically robust, have high quantum yield, have small diameters, and that can be incorporated into silicone polymers, that can subsequently be employed in the production of electronic devices, such as LEDs.

EXAMPLE

InP core nanoparticle quantum dots were initially prepared using a molecular cluster compound to seed nanoparticle growth according to the invention described in the co-pending European patent application, EP1743054A, incorporated by reference in its entirety.

A shell of ZnS was then deposited on the InP cores employing Ligand 1 as a capping agent.

Ligand 1

Ligand 1 was produced according to the reaction scheme shown below.

Hoveyda-Grubbs catalyst under standard conditions to cross-link adjacent terminal vinyl groups as shown in the exemplary reaction scheme below.

Alternatively, the terminal vinyl groups of Ligand 1 may be cross-linked before coordination to the nanoparticles as shown below.

To produce the InP/ZnS core-shell nanoparticles, a flame dried three-necked flask (100 ml), equipped with a condenser with a side arm, a thermometer, a suba seal and a stirrer bar was initially charged with indium phosphide core nanoparticles (0.155 g in 4.4 ml dibutyl sebacate) and degassed at 100° C. for 1 hour. The flask was allowed to cool to room temperature and then backfilled with nitrogen. Zinc acetate (0.7483 g) and Ligand 1 (0.5243 g) was then added, the mixture degassed at 55° C. for 1 hour and backfilled with nitrogen. The reaction temperature was increased to 190° C., tert-nonyl mercaptan (0.29 ml) was added dropwise, the temperature increased to 190° C. and held for 1 hour and 30 minutes. The temperature was decreased to 180° C., 1-octanol (0.39 ml) added and the temperature held for 30 minutes. The reaction mixture was cooled to room temperature.

InP/ZnS core-shell nanoparticles particles were isolated under $N_2$ in ethyl acetate by centrifugation. The particles were precipitated with acetonitrile followed by centrifugation. The particles were dispersed in chloroform and re-precipitated with acetonitrile followed by centrifugation. This dispersion-precipitation procedure using chloroform and acetonitrile was repeated four times in total. The InP/ZnS core-shell particles were finally dispersed in chloroform.

The resulting core-multishell nanoparticles coated with Ligand 1 as the capping agent may then be treated with a Either before or after cross-linking, the surface binding ligand the surface functionalised nanoparticles may be incorporated into silicone-based materials employing the methodology outlined in the reaction scheme below (x and y represent the number of repeating units of each silicone-containing species).

It will be seen that the techniques described herein provide a basis for improved production of nanoparticle materials. The terms and expressions employed herein are used as terms of description and not of limitation, and there is no intention in the use of such terms of and expressions of excluding any equivalents of the features shown and described or portions thereof. Instead, it is recognized that various modifications are possible within the scope of the invention claimed.

What is claimed is:

1. A method for producing surface functionalised nanoparticles, the method comprising:
   growing nanoparticles by reacting one or more nanoparticle precursor compounds in the presence of a nanoparticle surface binding ligand to effect growth of the nanoparticle and binding of the nanoparticle surface binding ligand to the surface of the nanoparticle, wherein
   the one or more nanoparticle precursor compounds contain ions to be incorporated into the nanoparticle, and
   the nanoparticle surface binding ligand incorporates a nanoparticle binding group and a silicone polymer binding group.

2. A method according to claim 1, wherein the silicone polymer binding group of the surface binding ligand comprises at least one of a crosslinkable or a polymerizable group.

3. A method according to claim 1, wherein the silicone binding group of the surface binding ligand comprises at least one unsaturated alkyl group.

4. A method according to claim 1, wherein the silicone binding group of the surface-binding ligand comprises two or more vinyl groups.

5. A method according to claim 1, wherein the nanoparticle binding group of the surface binding ligand contains an atom selected from the group consisting of sulfur, nitrogen, oxygen, and phosphorous.

6. A method according to claim 1, wherein the nanoparticle binding group of the surface binding ligand contains a species selected from the group consisting of thiol, an acid group, an ester group, and salts thereof.

7. A method according to claim 1, wherein the nanoparticle binding group of the surface-binding ligand contains a species selected from the group consisting of hydroxide, hydroxide salt, alkoxide, alkoxide salt, carboxylic acid, carboxylate ester, carboxylate salt, amine, ammonium salt, nitro, polyethyleneglycol, sulfonic acid, sulfonate ester, sulfonate salt phosphoric acid, phosphate ester, and phosphate salt.

8. A method according to claim 1, wherein the nanoparticle binding group and the silicone polymer binding group of the surface binding ligand are connected via a linker 9. A method according to claim 8, wherein said linker is selected from the group consisting of a covalent bond; a carbon, nitrogen, oxygen or sulfur atom; a substituted or unsubstituted, saturated or unsaturated aliphatic or alicyclic group; and a substituted or unsubstituted aromatic group.

10. A method according to claim 1, wherein said reaction is carried out in a solvent that is different from said nanoparticle surface binding ligand.

11. A method according to claim 10, wherein said solvent is a Lewis base compound.

12. A method according to claim 11, wherein said Lewis base compound is selected from the group consisting of hexadecylamine, tri-n-octylphosphine, tri-n-octylphosphine oxide, and octanol.

13. A method according to claim 1, wherein said nanoparticles are semiconductor nanoparticles.

14. A method according to claim 1, wherein said nanoparticles are core, core-shell or core-multishell nanoparticles.

15. A method according to claim 1, wherein said nanoparticles comprise at least one semiconductor material selected from the group consisting of CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge, MgS, MgSe, MgTe, and combinations thereof.

16. A surface functionalised nanoparticle comprising a nanoparticle bound to a nanoparticle surface binding ligand, said ligand incorporating a nanoparticle binding group and a silicone polymer binding group, wherein the nanoparticle is substantially free of damage caused by ligand exchange or interchelation.

17. The surface functionalised nanoparticle according to claim 16, wherein the nanoparticle is produced by:
  growing nanoparticles by reacting one or more nanoparticle precursor compounds in the presence of a nanoparticle surface binding ligand to effect growth of the nanoparticle and binding of the nanoparticle surface binding ligand to the surface of the nanoparticle, wherein
  the one or more nanoparticle precursor compounds contain ions to be incorporated into the nanoparticle, and
  the nanoparticle surface binding ligand incorporates a nanoparticle binding group and a silicone polymer binding group.

\* \* \* \* \*